(12) United States Patent
Burda et al.

(10) Patent No.: US 8,578,117 B2
(45) Date of Patent: Nov. 5, 2013

(54) WRITE-THROUGH-READ (WTR) COMPARATOR CIRCUITS, SYSTEMS, AND METHODS USE OF SAME WITH A MULTIPLE-PORT FILE

(75) Inventors: Gregory Christopher Burda, Raleigh, NC (US); Michael Scott McIlvaine, Raleigh, NC (US); Nathan Samuel Nunamker, Raleigh, NC (US); Yeshwant Nagaraj Kolla, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 563 days.

(21) Appl. No.: 12/703,342

(22) Filed: Feb. 10, 2010

(65) Prior Publication Data

US 2011/0197021 A1 Aug. 11, 2011

(51) Int. Cl.
*G06F 12/00* (2006.01)
(52) U.S. Cl.
USPC .................. 711/169; 711/108; 711/E12.049
(58) Field of Classification Search
None
See application file for complete search history.

(56) References Cited

U.S. PATENT DOCUMENTS

| | | | |
|---|---|---|---|
| 6,219,756 B1 | 4/2001 | Kasamizugami | |
| 7,343,477 B1 * | 3/2008 | Thatipelli et al. | 712/218 |
| 2004/0044882 A1 | 3/2004 | Asaad et al. | |
| 2004/0268089 A1 * | 12/2004 | Shelor | 712/43 |
| 2006/0168393 A1 | 7/2006 | Christensen et al. | |

OTHER PUBLICATIONS

International Search Report and Written Opinion—PCT/US2011/024227, ISA/EPO—Jun. 29, 2011.

* cited by examiner

*Primary Examiner* — Matthew Bradley
*Assistant Examiner* — Arvind Talukdar
(74) *Attorney, Agent, or Firm* — Nicholas J. Pauley; Peter Kamarchik; Joseph Agusta

(57) ABSTRACT

Write-through-read (WTR) comparator circuits and related WTR processes and memory systems are disclosed. The WTR comparator circuits can be configured to perform WTR functions for a multiple port file having one or more read and write ports. One or more WTR comparators in the WTR comparator circuit are configured to compare a read index into a file with a write index corresponding to a write-back stage selected write port among a plurality of write ports that can write data to the entry in the file. The WTR comparators then generate a WTR comparator output indicating whether the write index matches the read index to control a WTR function. In this manner, the WTR comparator circuit can employ less WTR comparators than the number of read and write port combinations. Providing less WTR comparators can reduce power consumption, cost, and area required on a semiconductor die for the WTR comparator circuit.

22 Claims, 6 Drawing Sheets

WRITE-THROUGH-READ (WTR) COMPARATOR CIRCUITS, SYSTEMS, AND METHODS USE OF SAME WITH A MULTIPLE-PORT FILE

BACKGROUND

I. Field of the Disclosure

The technology of the disclosure relates to write-through-read (WTR) comparator circuits and related systems and methods, and use of same in a multiple port (multi-port) file.

II. Background

An example of a file provided in central processing units (CPU) to store information is a register file. A register file is an array of registers in a CPU. A register file can be used to provide a set of architectural registers which are used to stage data between memory and function units on a CPU. A register file may contain entries that are statically assigned on a one-for-one correspondence to registers of the CPU. Alternatively, the entries in the register file may be allocated dynamically by the CPU using register renaming to map registers to particular register file entries during execution. One possible implementation of a dynamically allocated register file can be provided in a content-addressable memory (CAM). A CAM can also be used to store other types of CPU-related information. A CAM implements a look-up table function to determine if supplied search data is stored in any memory locations in the CAM. If the search data is contained in the CAM, either the data word or a list of one or more memory locations in the CAM containing the data matching the supplied compare data is returned.

FIG. 1 illustrates a block diagram of an exemplary CAM 10. The CAM 10 is comprised of an array of multiple entries. The multiple entries comprise any number of tag data fields 12 each configured to store any number of bits of tag data. In the example of FIG. 1, the CAM 10 is configured to store 0-N tag data fields 12 each comprised of 0-M bits, wherein N and M are any whole positive integers (i.e., $TAG_0$ [0-M]-$TAG_N$ [0-M]). Separate comparators 14 are provided for each bit of the tag data fields 12 (i.e., $COMPARATOR_0$ [0-M]-$COMPARATOR_N$[0-M]). READ data fields 16, each comprising a given number of bits of data (e.g., 0-P), are provided and correspond to each of the tag data fields 12 (i.e., READ $DATA_0$ [0-P]-READ $DATA_N$ [0-P]). The tag data fields 12 allow the READ data fields 16 to be dynamically allocated by storing indexes into the READ data fields 16. When a read function is performed in the CAM 10, 0-M bits of search data 18 are provided and input into corresponding comparators 14 to compare all bits of the search data 18 to corresponding bits of tag data stored in each of the tag data fields 12. For each match between all bits in the search data 18 and corresponding bits of tag data stored a tag data field 12, a match line signal is generated on corresponding match lines 20 which are encoded into an encoded match line 22. The encoded match line 22 provides a read index indicating in which tag data field 12 (i.e., index 0-N) the tag data matched the search data 18. This commonly occurs within a first clock cycle of the read function. The READ data in the READ data field 16 indicated by the encoded match line 22 is output from the CAM 10 as READ data 24 (i.e., READ DATA [0-P]) in a second clock cycle of the read function.

Data can also be written into the READ data fields 16 in the CAM 10. Write data 26 (i.e., 0-P bits; WRITE DATA [0-P]) can be written into a READ data field 16 generally in one clock cycle by enabling a write enable line 28 coupled to the READ data fields 16 and providing a write index 30 indicating in which entry (i.e., [0-N]) in the READ data field 16 the write data 26 is to be written. When a read function in the CAM 10 provides a match to a READ data field 16 being written to at the same time, a write-through-read (WTR) function is performed. In this case, the encoded match line 22 and the incoming write index 30 are compared using a WTR comparator 34. If there is a match indicating a read function to the same READ data field 16 being written, a comparator output 36 from the WTR comparator 34 selects the write data 26 input of multiplexor 38 in order to pass write data 26 to a READ data output 40. In this manner, the WTR function provides power savings by providing the requested data without switching the read bit lines of the READ data fields 16. In the typical case of the read function not being to the same READ data field 16 being written, the comparator output 36 will simply select the READ data 24 read from the matching READ data field 16.

Although only one WTR comparator 34 is illustrated in the exemplary CAM 10 of FIG. 1, a number of WTR comparators are employed if the CAM 10 is a multi-port file. For example, the CAM 10 could be configured to accept write requests from a number of write ports. The CAM 10 could also be configured to accept read requests via a number of read ports from different components or devices. In such case, the number of WTR comparators 34 ($n_{wtrc}$) needed would be equal to the number of write ports ($n_w$) times the number of read ports ($n_r$) (i.e., $n_{wtrc}=n_w \times n_r$). This is because a WTR comparison is needed for each read and write port combination. The $n_w \times n_r$ WTR comparators consume power while operating. Further, each WTR comparator incurs cost by requiring area on a semiconductor die.

SUMMARY OF THE DISCLOSURE

Embodiments disclosed in the detailed description include write-through-read (WTR) comparator circuits and related processes. The WTR comparator circuits disclosed herein may be included in a memory system and can be configured to perform WTR functions for a multiple port (multi-port) file having one or more read ports and one or more write ports. In this regard, one or more WTR comparators in the WTR comparator circuit are configured to compare a read index indexing an entry into a file to be read with a write index corresponding to a selected write port. The selected write port is the write port among a plurality of write ports that can write data to the entry. The WTR comparators then generate a WTR comparator output indicating whether the write index matches the read index to control a WTR function. In this manner, the WTR comparator circuit is configured to employ less WTR comparators than the number of read port and write port combinations while still providing WTR functionality. Each entry in the file can be written by one write port at a given time, and thus WTR comparators are not required in the WTR comparator circuits for each read and write port combination. Providing less WTR comparators can reduce both active and leakage power consumption, cost, and area required on a semiconductor die to provide the WTR comparator circuit.

In one embodiment, the multi-port file is a central processing unit (CPU) register file configured to store CPU registers. When an instruction is fetched and provided to a processor in a CPU, an allocate function in the register file stores write-back stage data indicating from which pipeline stage a write function for the instruction will be performed. In this manner, when a WTR comparison is performed between write data from a given write port to an entry in the register file, the write-back stage data is used to select the only write index into the file in which a WTR compare match can occur. The selected write index is provided to the WTR comparator in lieu of requiring a WTR comparator for each write index (i.e., for each write port). Thus, in lieu of requiring a WTR comparator for each write port and read port combination, wherein the number of WTR comparators ($n_{wtrc}$) would equal the number of read ports ($n_r$) times the number of write ports ($n_w$) (i.e., $n_{wtrc}=n_r \times n_w$), the number of WTR comparators provided can be reduced to the number of read ports ($n_r$).

The WTR comparator circuits disclosed herein can be used in any memory system, electronic device, or processor-based system. The WTR comparator circuits can be used in conjunction with any type of file, including but not limited to a register file. The WTR comparator circuits can be used to perform WTR functions for any type of memory, including but not limited to a content-addressable memory (CAM), a cache memory, and a system or main memory. The number of WTR comparators provided in the WTR comparator circuits is not limited to the number of read ports into a given file. The WTR comparators may be provided in any form, circuit, or logic, including but not limited to dynamic and static-based logic.

DETAILED DESCRIPTION

Figure 1:
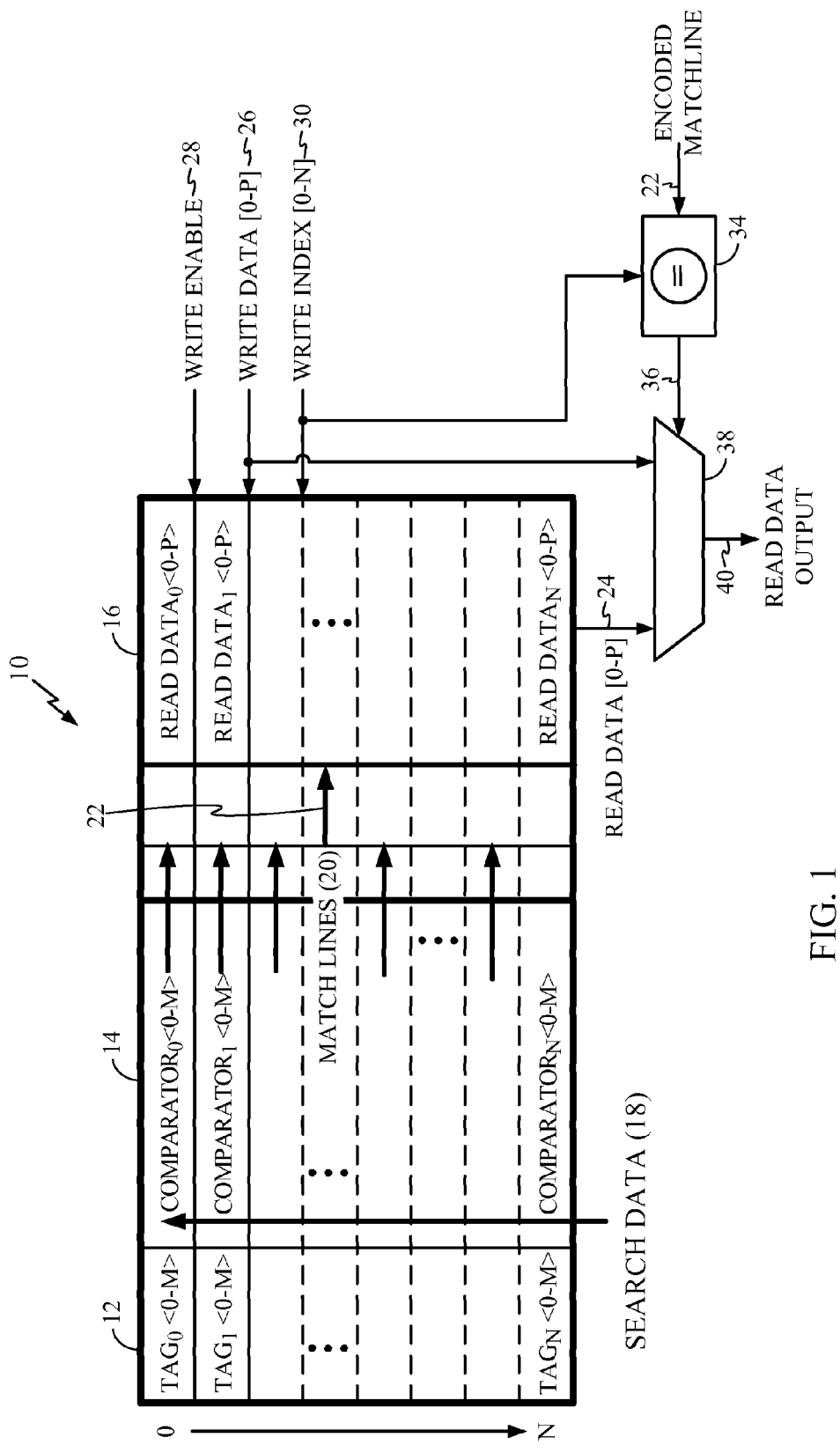
FIG. 1 is a block diagram of an exemplary content-addressable memory (CAM) register file employing a write-through-read (WTR) comparator function.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include write-through-read (WTR) comparator circuits and related processes. The WTR comparator circuits disclosed herein may be included in a memory system and can be configured to perform WTR functions for a multiple port (multi-port) file having one or more read ports and one or more write ports. In this regard, one or more WTR comparators in the WTR comparator circuit are configured to compare a read index indexing an entry into a file to be read with a write index corresponding to a selected write port. The selected write port is the write port among a plurality of write ports that can write data to the entry. The WTR comparators then generate a WTR comparator output indicating whether the write index matches the read index to control a WTR function. In this manner, the WTR comparator circuit is configured to employ less WTR comparators than the number of read port and write port combinations while still providing WTR functionality. Each entry in the file can be written by one write port at a given time, and thus WTR comparators are not required in the WTR comparator circuits for each read and write port combination. Providing less WTR comparators can reduce both active and leakage power consumption, cost, and area required on a semiconductor die to provide the WTR comparator circuit.

Figure 2:
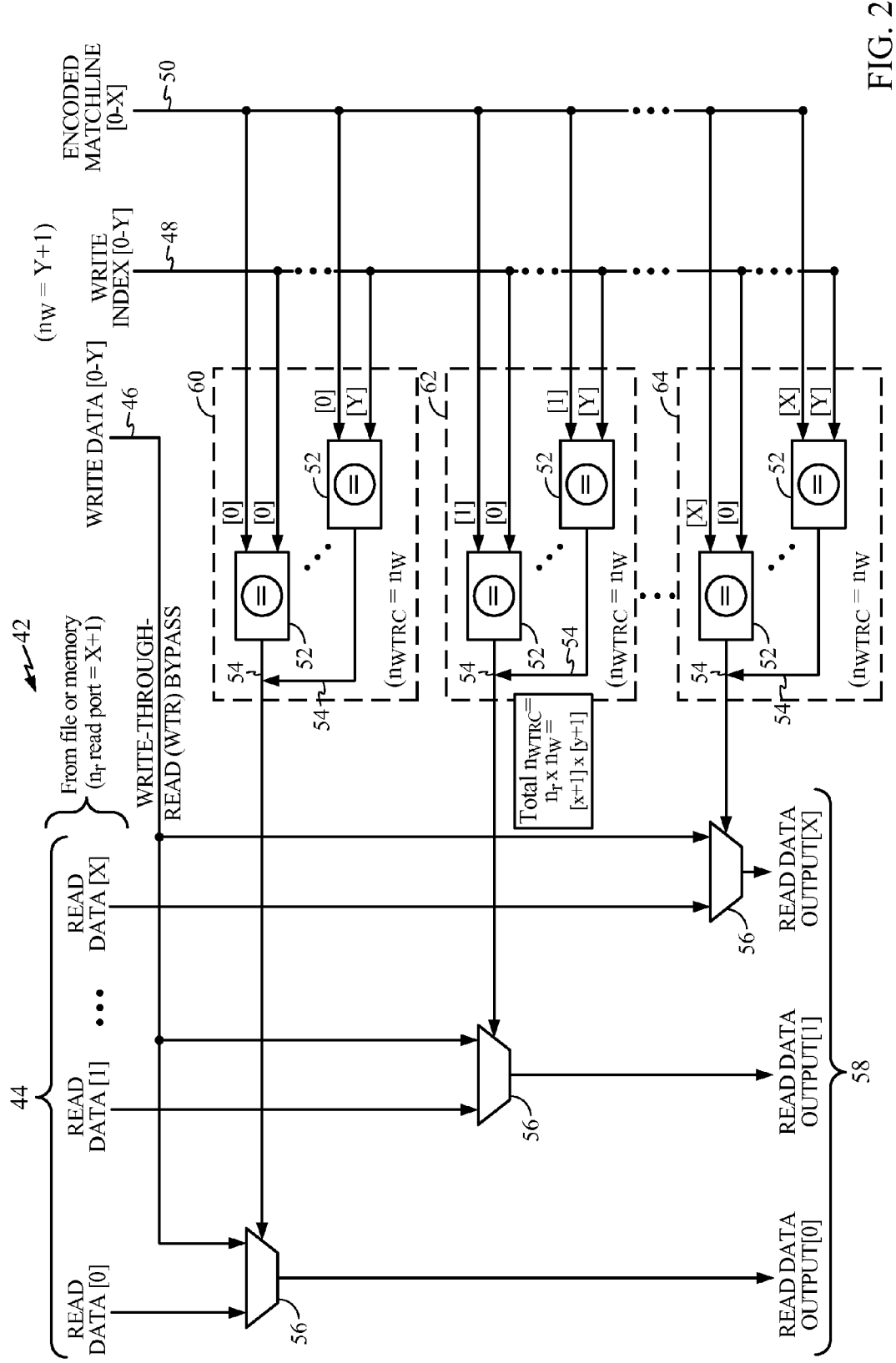
FIG. 2 is a block diagram of an exemplary WTR comparator circuit for a multiple port (multi-port) register file, where the number of WTR comparators included equals the number of read ports times the number of write ports in the multi-port file.

Before discussing embodiments of WTR comparator circuits where the number of WTR comparators is reduced, FIG. 2 is first discussed. FIG. 2 illustrates a WTR comparator circuit 42 that can be employed in a multi-port register file or any other multi-port file, where the number of WTR comparators ($n_{wtrc}$) is equal to number of read ports ($n_r$) times the number of write ports ($n_w$). As illustrated in FIG. 2, the WTR comparator circuit 42 is comprised of read data 44 for each read port (i.e., READ DATA [0–X], which is X+1 read ports) from a file. Data read as a result of a read request into the file from a given read port is provided in corresponding read data 44. For example, if a read request is from read port 0, data from the file corresponding to the read request is provided on READ DATA [0]. If the file is a content-addressable memory (CAM), the read data 44 contains data where a match occurred between search data provided to the CAM and a tag data field in the CAM. Data is commonly output from a file to the read data 44 in a second clock cycle of a read function.

Data to be written to the file is provided as write data 46 (i.e., WRITE DATA). Data is written from the write data 46 to the file generally in one clock cycle by enabling a write enable line coupled to the file and providing a write index 48 indicating the location in the file for the write data 46 to be written. Each write port (i.e., 0–Y write ports) in a multi-write port file can provide write data 46 to be stored in a file. For example, if the WTR comparator circuit 42 is employed in a central processing unit (CPU) employing an execution pipeline, multiple pipeline stages can provide a write function to provide write data 46 to write to a file.

When a read function into the file is to the same location as indicated by the write index 48, a write-through-read (WTR) function can be performed. In this case, since the WTR comparator circuit 42 is for a multi-port file having multiple read and write ports, encoded match lines 50 for each of the read ports (i.e., ENCODED MATCH LINE [0–X]) are compared to the incoming write indexes 48 from each of the write ports (i.e., WRITE INDEX [0–Y]) by WTR comparators 52 provided for each combination of read and write ports, as will be discussed below. The WTR comparators 52 each provide a WTR comparator output 54 for each read and write port combination indicating if a match exists between the file location being read by a given read port and written from a given write port. If a match exists, the WTR comparator output 54 selects the write data 46 bypassed into a selector or selecting device, which is exemplified by a multiplexor 56, provided for each read port to be provided to a read data output 58 back to the requestor in lieu of from the memory or file. In this manner, processing time and power is saved by not having to switch read bit lines in the file to output the data in the requested file location to the read data 44. If a match does not exist, the WTR comparator 52 selects the read data 44 provided from the file as a result of switching read bit lines to the multiplexor 56 as the read data 44.

Because each write port needs to be able to generate a WTR comparison for each read port, a WTR comparator 52 is provided for each combination of read and write ports. For example, as illustrated in FIG. 2, to compare a read request generated by read port 0 to a write request from write port 0, a WTR comparator 52 is provided to compare WRITE INDEX [0] (i.e., write index 48 for write port 0) to ENCODED MATCH LINE [0] (i.e., encoded match line 50 for port 0). Similarly, additional WTR comparators 52 are provided to compare write requests from write ports 1 to Y with a read request generated from read port 0. Thus, for read port 0, a bank of WTR comparators 60 equal to the number of write ports $n_w$ (i.e., [0–Y] write ports) is provided. Because more than one read port is provided in the WTR comparator circuit 42 of FIG. 2, additional banks of WTR comparators 62, 64 equal to the additional number of read ports $n_r$ 1 to X are also provided, with each bank 62, 64 containing a number of WTR comparators 52 equal to the number of write ports $n_w$. Thus, the total number of WTR comparators 52 ($n_{wtrc}$) in the WTR comparator circuit 42 equals the number of read ports ($n_r$) (i.e., [0–X], which equals X+1 read ports) times the number of write ports ($n_w$) (i.e., 0–Y, which equals Y+1 write ports), equaling $n_r \times n_w$ WTR comparators 52 (i.e., [X+1]×[Y+1]).

If the WTR comparator circuit 42 in FIG. 2 were employed for a register file, the larger the number of write ports ($n_w$), the higher the probability that any particular WTR comparison will miscompare. This is because a given instruction executed by a CPU has only one pipeline stage from which it will provide write data to a given data field (i.e., location) in the register file. All other write ports will be inconsequential for a given data field (i.e., location) because the other write ports will be writing data from pipeline stages to different allocated data fields (i.e., different locations) in the register file. As a result, excessive power is wasted performing WTR compares that are destined to miscompare. Further, providing $n_w \times n_r$ WTR comparators, most of which will generate miscompares, increases power consumption in terms of both active and leakage current, cost, and area required on a semiconductor die to provide the WTR comparators for a register file. Thus, embodiments disclosed herein provide examples of WTR comparator circuits that reduce the number of WTR comparators to reduce power consumption, cost, and area while still providing WTR functionality.

Figure 3:
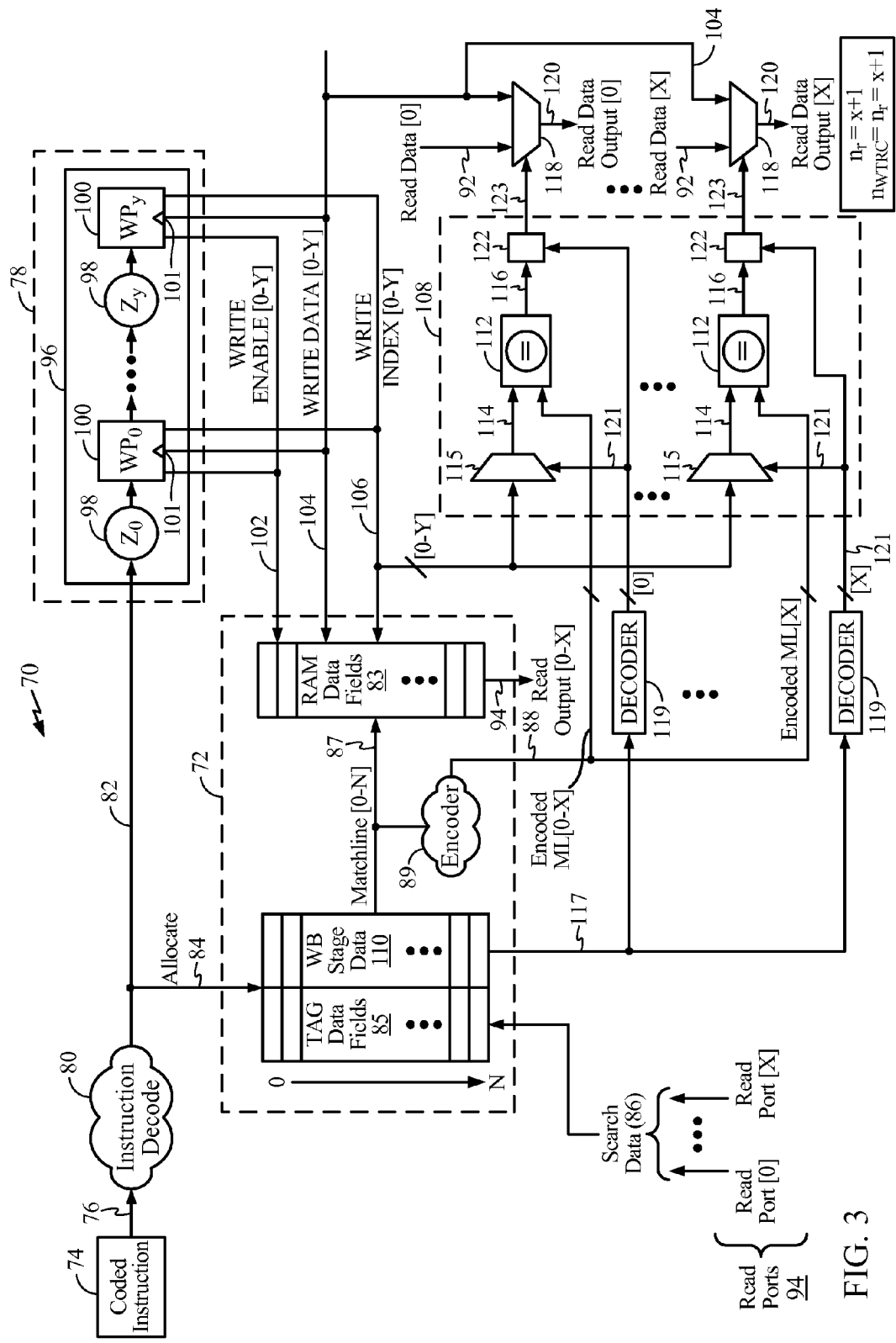
FIG. 3 is a block diagram of an exemplary central processing unit (CPU) having a multi-port file and employing a WTR comparator circuit employing less WTR comparators than the number of read ports times the number of write ports in the multi-port file.

FIG. 3 illustrates a first embodiment of a WTR comparator circuit that supports a multi-port file system and provides a reduced number of WTR comparators. In this embodiment, the multi-port file is a central processing unit (CPU) register file configured to store CPU registers. When an instruction is fetched and provided to a processor in a CPU, an allocate function in the register file stores write-back stage data indicating from which pipeline stage a write function for the instruction will be performed. In this manner, when a WTR comparison is performed between write data from a given write port to an entry in the register file, the write-back stage data is used to select the only write index into the file in which a WTR compare match can occur. The selected write index is provided to the WTR comparator in lieu of having to provide a WTR comparator for each write index (i.e., for each write port). Thus, in lieu of having to provide a WTR comparator for each write port and read port combination, where the number of WTR comparators ($n_{wtrc}$) would equal the number of read ports ($n_r$) times the number of write ports ($n_w$) (i.e., $n_{wtrc} = n_r \times n_w$), the number of WTR comparators provided can be reduced to the number of read ports ($n_r$).

In this regard, turning to FIG. 3, a CPU 70 employing a CAM 72 is provided, although any other type of file system may be used. In the CPU 70, a coded instruction 74 in software, firmware, or microcode is fetched and provided on an instruction line 76 to be executed by a processor 78 or other circuitry in the CPU 70. The coded instruction 74 is decoded using an instruction decoder 80 to generate various instruction signals 82 to instruct the processor 78 on how to execute the coded instruction 74. The CAM 72 employs RAM data fields 83 to store register files for the CPU 70. Tag data fields 85 in the CAM 72 allow dynamic allocation (i.e., mapping) of the RAM data fields 83 to store register information. If execution of a coded instruction 74 will require data to be written to the CAM 72, the instruction signals 82 indicate to the CAM 72 to perform an allocate function 84 to reserve a RAM data field 83. In this manner, when a write function to the CAM 72 is performed as a result of execution of a coded instruction 74 by the processor 78, a RAM data field 83 will have been allocated for storing the register information.

A read function is performed in the CAM 72 by providing search data 86 to the CAM 72, which is then compared against the information stored in tag data fields 85. A match generates match lines 87 for each tag data field 85 (i.e., ML [0–N]) to select a matching RAM data field 83 containing the register information requested. The match lines 87 may also be encoded by an encoder 89 port to provide an encoded match line 88 for each read port (i.e., ENCODED ML [0–X]) used for determining if a WTR function should be performed, as will be discussed in more detail below. The requested information is then output into read data 92 from the RAM data fields 83 according to the match lines 87. Because the CPU 70 illustrated in FIG. 3 contains multiple read ports 94 to service read requests from multiple components or devices, each read port 94 (i.e., READ PORT [0–X]) can provide search data 86 to the CAM 72. Thus, multiple read data 92 (i.e., READ DATA [0–X]) is provided for each read port 94 to provide requested read data from the RAM data fields 83 to each requesting component or device providing search data 86 in a read function.

In the example CPU 70 of FIG. 3, the processor 78 contains an execution pipeline 96 containing multiple pipeline stages 98 [i.e., $Z_0$-$Z_Y$] to split the processing of the coded instruction 74 into a series of processing tasks. Each pipeline stage 98 contains a write function 100 after each pipeline stage 98 in case data is to be written into the CAM 72 at that pipeline stage 98. Thus, the number of write ports (WP) 101 accessible into the CAM 72 is equal to the number of pipeline stages 98 (i.e., WP [0–Y], which is equal to Y+1 write ports). Each write function 100 and thus each write port 101 (i.e., WP [0–Y]) comprises a write enable line 102 (i.e., WRITE ENABLE [0–Y] for 0–Y write ports) to enable the desired location in RAM data field 83 to be written. Write data 104 can be provided from each write port 101 so that each write function 100 can write data into a RAM data field 83. The location in the RAM data fields 83 in which to write the data is provided by each write function 100 as a write index 106. Each write function 100 provides a dedicated write index 106 for a write function (i.e., WRITE INDEX [0–Y] for 0–Y write ports).

Only one write function 100 in the execution pipeline 96 is capable of generating a WTR for each RAM data field 83. All other write functions in other pipeline stages 98 will be irrelevant for a given RAM data field 83 in the CAM 72, because only one pipeline stage 98 can perform a write function 100 for a given instruction in this example. Thus, only one write index 106 is needed to be compared by a WTR comparator with each encoded match line 88 for each read port 94, because only one write index 106 for a given write port 101 can match an encoded match line 88 for a particular read port 94 for a given RAM data field 83. If the only write index 106 that can generate a write function 100 to a particular RAM data field 83 were known, only one WTR comparator would have to be provided to handle a WTR function for a given read port 94 in lieu of having to provide a WTR comparator for each read port 94 and write port 101 combination.

In this regard, a WTR comparator circuit 108 is provided that employs less WTR comparators than the number of read port 94 ($n_r$) and write port 101 ($n_w$) combinations. The WTR comparator circuit 108 uses the knowledge of which pipeline stage 98 a write function 100 will write data to the CAM 72 for a given instruction. In this example, the knowledge of which pipeline stage 98 the write function 100 will write data to the CAM 72 for a given instruction comes from an array of write-back stage data 110 (i.e., WB STAGE DATA) provided in the CAM 72 for each tag data field 85. The write-back stage data 110 stores in which pipeline stage 98 data will be written to a given RAM data field 83 for a coded instruction 74 passed to the execution pipeline 96 for execution. The write-back stage data 110 is used to select the correct write data 104 to compare a given RAM data field 83. Thus, when a WTR comparison is performed between write data 104 from a given write port 101 with data in a given RAM data field 83, the write-back stage data 110 can be used to select the only write index 106 in which a WTR compare match can occur. Thus, in lieu of having to provide a WTR comparator for each write port 101, only one WTR comparator is required for all write ports 101. This is illustrated in the exemplary WTR comparator circuit 108 of FIG. 3 and discussed further below.

As illustrated in FIG. 3, only one WTR comparator 112 for each read port 94 is provided in the WTR comparator circuit 108. Each WTR comparator 112 receives the encoded match line 88 for a given read port 94 (i.e., ENCODED ML [0–X]) to compare against a write index output 114 selected by a write index selector or selecting device, which is exemplified by a multiplexor 115, receiving the write indexes 106 (i.e, WRITE INDEX [0–Y]). A write-back stage output 117 for each read port 94 (i.e., WB STAGE DATA [0–X]) provided from the write-back stage data 110 can be decoded via dedicated decoders 119. Alternatively, the write-back stage data 110 could have been decoded when stored in response to the allocate function 84 in lieu of providing the decoders 119. If decoders 119 are provided as illustrated in FIG. 3, decoder outputs 121 are coupled to the selector of the multiplexor 115 to select which write index 106 will be compared to the encoded match line 88 for a given read port 94. Again, this is because only one pipeline stage 98 in the execution pipeline 96 performs a write function 100 to write data to a given RAM data field 83 in the CAM 72 for a given instruction. Only the write index 106 corresponding to the write port 101 that can write data to a given RAM data field 83 need be compared to the encoded match line 88 for each read port 94. Thus, only one WTR comparator 112 is needed for each read port 94.

A WTR comparator output 116 is generated by each WTR comparator 112 to select whether the write data 104 is provided to a read data output 120 in a WTR function if a match is determined by the WTR comparator 112, or if the read data 92 from a RAM data field 83 is provided to the read data output 120 in the case of no match. A read data output 120 (i.e., READ DATA OUTPUT [0–X]) is provided for each read port 94. In order to select the correct write data [0–Y] 104 to bypass onto the read data output 120 through the multiplexor 118 in this embodiment, the WTR comparator output 116 is further qualified by a output selector circuit 122 with the decoder output 121. The decoder output 121 is the decoded form of the write-back stage data 110. The output selector circuit 122 uses the decoder output 121 to select which write index 106 will participate in the comparison made by the WTR comparator 112 so that the WTR comparator output 116 can select which write data 104 should be bypassed to the read data output 120. This can be accomplished by the output selector circuit 122 including AND and/or NAND-based logic gating between the WTR comparator output 116 and the decoder output 121. The output 123 of the output selector circuit 122 is used to drive the selector for the multiplexor 118.

In the example of the WTR comparator circuit 108 illustrated in FIG. 3, the number of WTR comparators 112 is reduced to the number of read ports 94 ($n_r$). For comparison illustration purposes, the number of WTR comparators 112 in the WTR comparator circuit 108 in FIG. 3 is reduced by a factor of the number of write ports 101 ($n_w$) from the number of WTR comparators 52 in the WTR comparator circuit 42 of FIG. 2. Reducing the number of WTR comparators reduces power consumption due to switching that would otherwise occur. Further, reducing the number of WTR comparators reduces costs and the area needed on a semiconductor die to provide a WTR comparator circuit.

Figure 4:
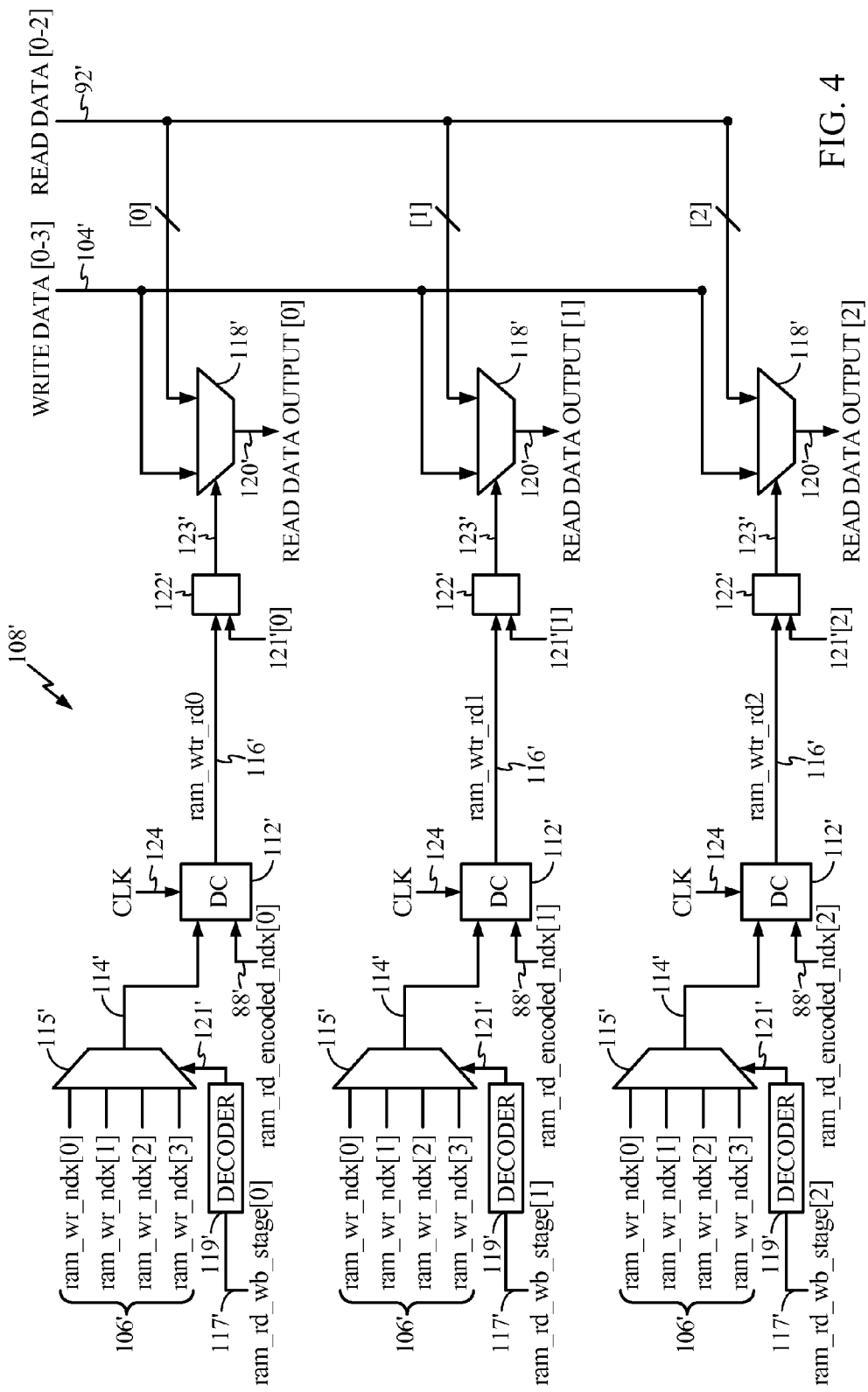
FIG. 4 is a block diagram of an alternate WTR comparator circuit for a multi-port file employing less WTR comparators than the number of read ports times the number of write ports in the multi-port register file.

FIG. 4 illustrates an alternate embodiment of a WTR comparator circuit 108' that may be employed to provide a WTR function for a file, which may be stored in a memory and may be employed in the CPU 70 of FIG. 3. For convenience purposes, elements in FIG. 4 that are common to elements in FIG. 3 will be labeled with same element numbers, except that a (') mark will be used in FIG. 4. The WTR comparator circuit 108' in FIG. 4 is specifically configured to handle four (4) write ports and three (3) read ports. As illustrated in FIG. 4, four (4) write indexes 106' for four (4) write ports (i.e., RAM_WR_NDX [0-3]) are provided to provide an index into a file during a write function. So that only one WTR comparator 112' need be provided for each of the three (3) read ports, each write index 106' is input into three (3) multiplexors 115', one for each read port. Write-back stage output 117 for each read port (i.e., RAM-RD_WB_STAGE [0-2]) is decoded via dedicated decoders 119' and used to select which write index 106' from the multiplexors 115' will be coupled to WTR comparators 112' for each read port to compare against an encoded match line 88' (i.e., RAM_RD_ENCODED_NDX [0-2]) providing a read index of which entry in a file to read resulting from a read request from a read port. This is because, as discussed above, only one write port and thus one write index 106' for a given write port can select a given location in a file to write data. Each WTR comparator 112' provides a WTR comparator output 116' that indicates whether or not a write function was to the same location in the file read. This WTR comparator output 116' for each read port is then used to select whether write data 104' is bypassed to a read data output 120', or whether read data 92' from the file is output to the read data output 120'.

Figure 5:
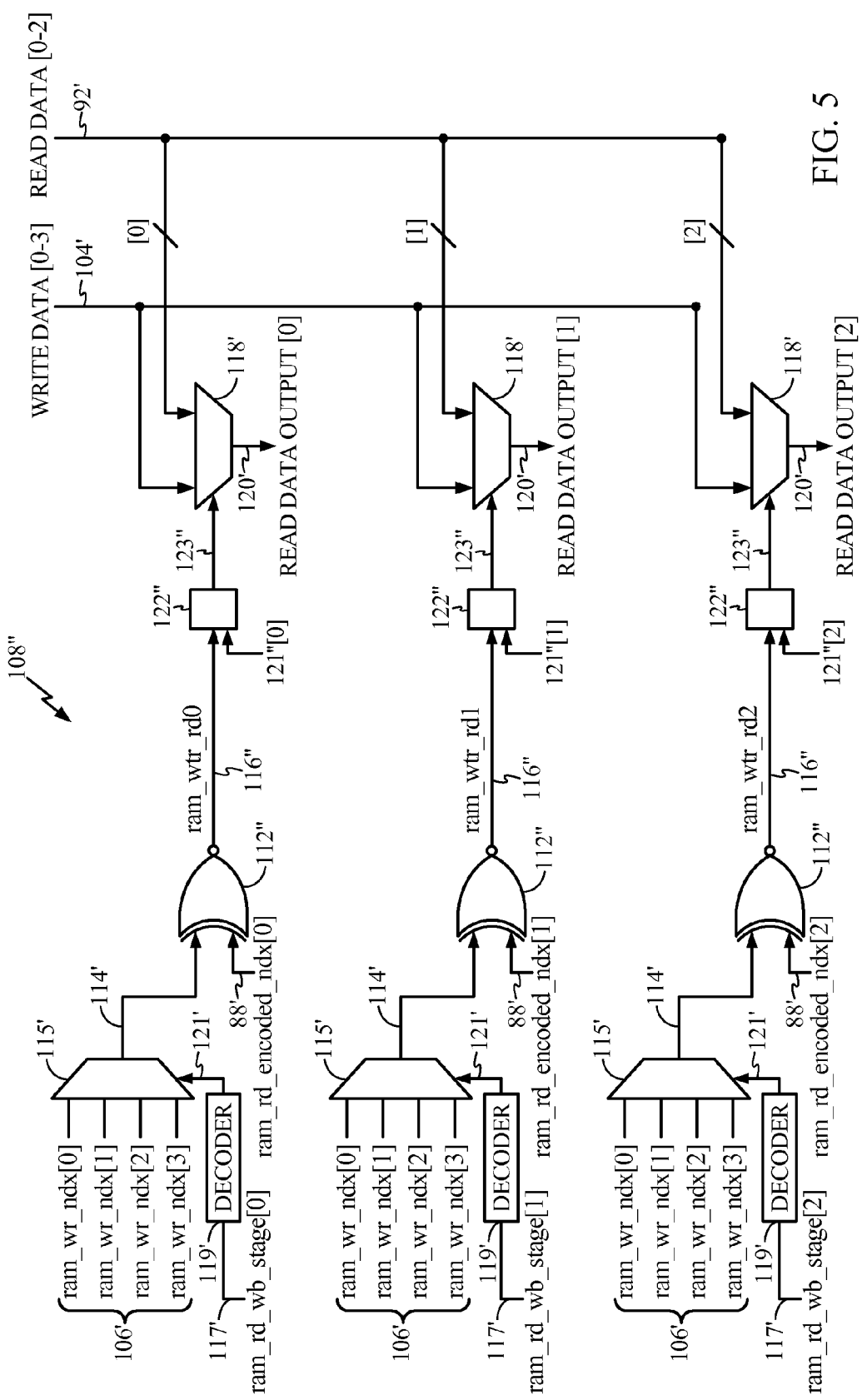
FIG. 5 is a block diagram of another alternate WTR comparator circuit for a multi-port file employing less WTR comparators than the number of read ports times the number of write ports in the multi-port register file.

In the WTR comparator circuit 108' of FIG. 4, the WTR comparators 112' are dynamic comparators (DC). A clock signal 124 is provided to each WTR comparator 112' to clock the WTR comparators 112'. However, the WTR comparators 112' are not required to be dynamic comparators. Any type of comparator or comparator circuit may be employed. For example, as illustrated in FIG. 5, static-based WTR comparators 112" are provided in place of the dynamic comparators 112'. Static-based logic is not clocked and thus no clock signal is required. Static-based logic comparators are typically slower than dynamic comparators, but expend less energy since energy is not dissipated unless switching is performed. Static-based logic comparators can also be used in WTR comparator circuits employed in systems where it may be desired to run the system at low clock rates to conserve power below minimum clock rates required for dynamic comparators.

In the WTR comparator circuit 108" example of FIG. 5, the WTR comparators 112" are illustrated as exclusive NOR (XNOR) gates. However, exclusive OR (XOR) gates could also be used. Further, any other static-based logic circuits that can be used or combined to provide a comparator function could also be employed for the WTR comparators 112". In the WTR comparator circuit 108" of FIG. 5, all other components and logic and their functionality are the same as provided in the exemplary WTR comparator circuit 108' in FIG. 4 and thus will not be repeated.

The WTR comparators, WTR comparator circuits according to the designs and methods discussed herein may be included or integrated in a semiconductor die, integrated circuit, and/or device, including an electronic device and/or processor-based device or system. Examples of such devices include, without limitation, a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player.

Figure 6:
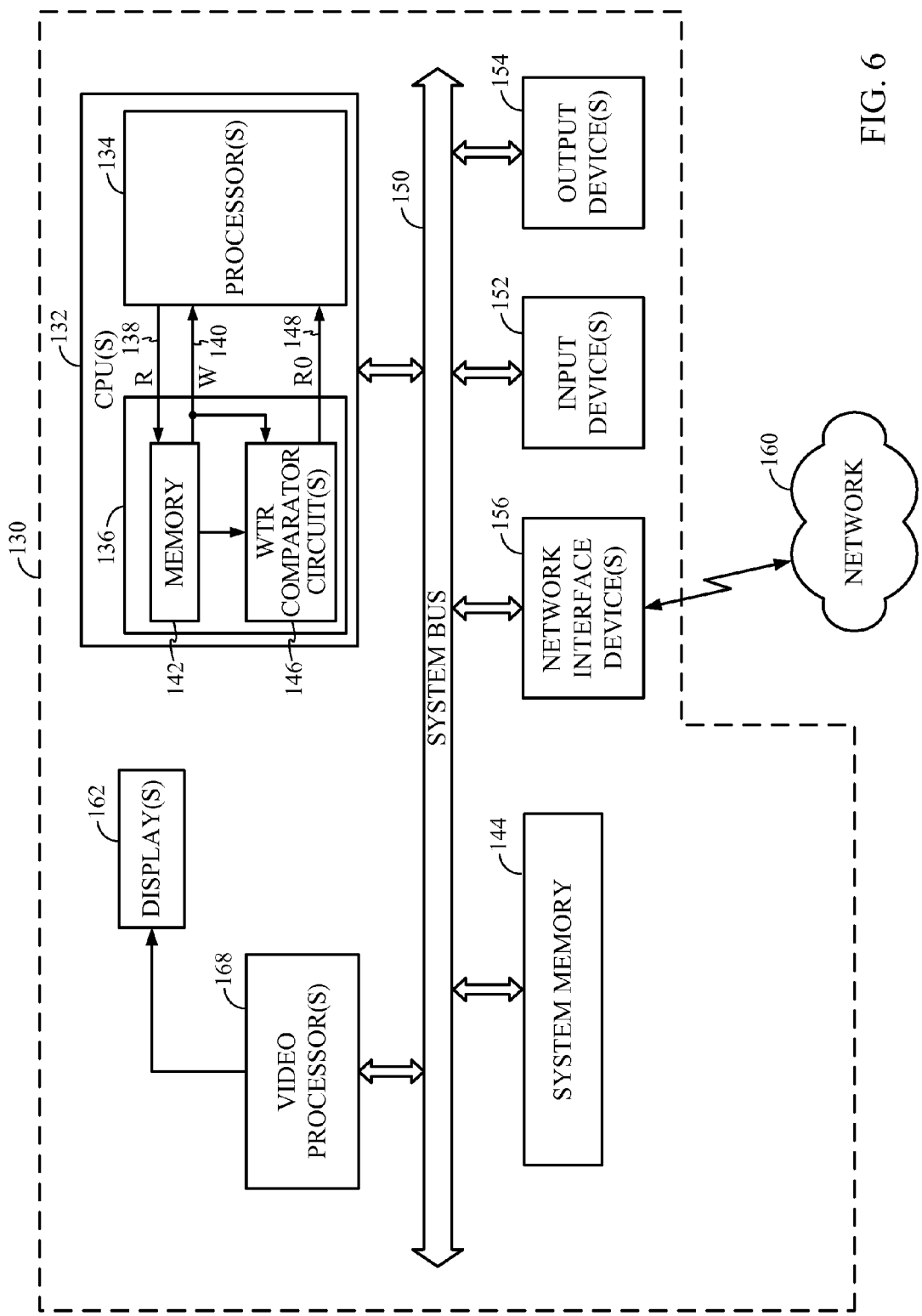
FIG. 6 is a block diagram of an exemplary processor-based system employing a WTR comparator circuit and which may be included in any type of electronic device.

In this regard, FIG. 6 illustrates an example of processor-based system 130 that can employ a WTR comparator circuit(s) like those previously described. In this example, the processor-based system 130 includes one or more central processing unit (CPUs) 132 each including one or more processors 134. The processor(s) 134 is configured to communicate with a memory system 136, which may be a register file and may be a CAM, to read and write data to and from the memory system 136. Read and write lines (R, W) 138, 140 are coupled between the processor 134 and memory 142 to read and write data from and write data to the memory 142, respectively. The data may be register information or cached memory from a system memory 144. A WTR comparator circuit 146 is provided in the memory system 136 that receives information from the memory 142 and is coupled to write lines 140 to perform WTR functionality and to provide read output (RO) 148 regarding data stored in the memory 142 to the processor 134. The read output 148 could also be coupled to any other component or device. Further, the memory system 136 and the WTR comparator circuit 146 may be configured to handle multiple read and/or write ports, as previously described.

The CPU 132 in FIG. 6 is also coupled to a system bus 150, which intercouples other devices included in the processor-based system 130. As is well known, the CPU 132 communicates with these other devices by exchanging address, control, and data information over the system bus 150. These devices can include any types of devices. As illustrated in FIG. 6, these devices can include the system memory 144, one or more input devices 152, one or more output devices 154, one or more network interface devices 156, and one or more display controllers 158, as examples.

The input devices 152 can include any type of input device, including but not limited to input keys, switches, voice processors, etc. The output devices 154 can include any type of output device, including but not limited to audio, video, other visual indicators, etc. The network interface device(s) 156 can be any devices configured to allow exchange of data to and from a network 160. The network 160 can be any type of network, including but not limited to a wired or wireless network, private or public network, a local area network (LAN), a wide local area network (WLAN), and the Internet. The network interface device(s) 156 can support any type of communication protocol desired. The CPU 132 can access the system memory 144 over the system bus 150. The system memory 144 can include static memory and/or dynamic memory.

The CPU 132 can also access the display controller(s) 158 over the system bus 150 to control information sent to one or more displays 162. The display controller(s) 158 sends information to the display(s) 162 to be displayed via one or more video processors 168, which process the information to be displayed into a format suitable for the display(s) 162. The display(s) 162 can include any type of display, including but not limited to a cathode ray tube (CRT), a liquid crystal display (LCD), a plasma display, etc.

Those of skill in the art would further appreciate that the various illustrative logical blocks, modules, circuits, and algorithm steps described in connection with the embodiments disclosed herein can be implemented as electronic hardware, computer software, or combinations of both. The WTR comparator circuits described herein may be employed in any memory or file system, including but not limited to a CAM, a cache memory, system memory, and main memory. The memory or file system may be configured to store any type of information, including but not limited to CPU registers, and cached memory. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may store and compare any type of data, including but not limited to tag data, and may be implemented or performed with any signal levels to provide logical true and logical false. Logical true can be represented as a logical high (e.g., "1", $V_{DD}$) and logical false as a logical low (e.g., "0", $V_{SS}$), or vice versa. The various illustrative logical blocks, modules, and circuits described in connection with the embodiments disclosed herein can also be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

It is noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A circuit comprising:
a file comprising a plurality of read ports and a plurality of write ports, the file to store entries;
a processor pipeline comprising a plurality of stages, each stage having a corresponding write port, the file to store write-back stage data indicating which write port is to write to a given entry;
at least one WTR comparator configured to:
compare a read index indexing an entry in the file requested to be read and a write index corresponding to a selected write port, wherein the write-back stage data indicates the selected write port as writing to the entry;
generate a WTR comparator output indicating whether the write index matches the read index; and
a read data output selector configured to selectively generate a read data output of either write data to the file or read data from the file, based on the WTR comparator output.

2. The circuit of claim 1, wherein the at least one WTR comparator corresponds to the plurality of read ports.

3. The circuit of claim 1, wherein the write data corresponds to the selected write port.

4. The circuit of claim 1, wherein the at least one WTR comparator is comprised of a plurality of WTR comparators each corresponding to the plurality of read ports.

5. The circuit of claim 4, further comprising a plurality of write index selectors each configured to selectively provide the write index to one of the plurality of WTR comparators based on the write-back stage data for one of the plurality of read ports.

6. The circuit of claim 4, further comprising a plurality of read data output selectors each configured to selectively generate a read data output of either write data to the file or read data from the file, based on the WTR comparator output for one of the plurality of read ports.

7. The circuit of claim 1, wherein the at least one WTR comparator is comprised of a plurality of WTR comparators equal to or less than the plurality of read ports into the file.

8. The circuit of claim 1 integrated in at least one semiconductor die.

9. The circuit of claim 1, further comprising a device selected from the group consisting of a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player, into which the circuit is integrated.

10. A circuit comprising:
a file comprising a plurality of read ports and a plurality of write ports, the file to store entries;
a processor pipeline comprising a plurality of stages, each stage having a corresponding write port, the file to store write-back stage data indicating which write port is to write to a given entry;
a means for comparing a read index indexing an entry in the file requested to be read and a write index corresponding to a selected write port, wherein the write-back stage data indicates the selected write port as writing to the entry;
a means for generating a WTR comparator output indicating whether the write index matches the read index; and
a means to selectively generate a read data output of either write data to the file or read data from the file, based on the WTR comparator output.

11. A method of performing a write-through-read (WTR) compare, comprising:
storing entries in a file comprising a plurality of read ports and a plurality of write ports;
storing write-back stage data in the file to indicate which write port of the file is to write to a given entry;
comparing a read index indexing an entry in the file requested to be read and a write index corresponding to a selected write port, wherein the write-back stage data indicates the selected write port as writing to the entry;
generating a WTR comparator output indicating whether the write index matches the read index; and
selectively generating a read data output of either write data to the file or read data from the file, based on the WTR comparator output.

12. The method of claim 11, further comprising selecting the selected write port among the plurality of write ports into the file.

13. The method of claim 11, further comprising selectively providing the write index from a plurality of write indexes based on the write-back stage data.

14. A memory system, comprising:
a memory configured to store one or more entries, the memory comprising a plurality of read ports and a plurality of write ports;

a processor pipeline comprising a plurality of stages, each stage having a corresponding write port, the memory to store write-back stage data indicating which write port is to write to a given entry;

at least one write-through-read (WTR) comparator coupled to the memory and configured to:

compare a read index indexing an entry in the memory requested to be read and a write index corresponding to a selected write port, wherein the write-back stage data indicates the selected write port as writing to the entry;

generate a WTR comparator output indicating whether the write index matches the read index; and a read data output selector configured to selectively generate a read data output of either write data to the memory or read data from the memory, based on the WTR comparator output.

15. The memory system of claim 14, wherein the memory is selected from the group consisting of a central processing unit (CPU) register file, a content-addressable memory (CAM), a cache memory, and a system memory.

16. The memory system of claim 14, wherein the read data output is coupled to a processor or a system bus.

17. The memory system of claim 14, further comprising a write index selector configured to selectively provide the write index based on the write-back stage data.

18. The memory system of claim 17, wherein the write-back stage data corresponds to a write-back stage in the processor pipeline in which the write data is provided to the memory.

19. The memory system of claim 14, wherein the at least one WTR comparator is comprised of a plurality of WTR comparators each corresponding to one of the plurality of read ports into the memory.

20. The memory system of claim 19, further comprising a plurality of write index selectors each configured to selectively provide the write index to one of the plurality of WTR comparators based on the write-back stage data for one of the plurality of read ports.

21. The memory system of claim 19, further comprising a plurality of read data output selectors each configured to selectively generate a read data output of either write data to the file or read data from the file, based on the WTR comparator output for one of the plurality of read ports.

22. The circuit of claim 4, further comprising an encoder configured to provide encoded match lines for each read port.

* * * * *

UNITED STATES PATENT AND TRADEMARK OFFICE
CERTIFICATE OF CORRECTION

PATENT NO. : 8,578,117 B2  
APPLICATION NO. : 12/703342  
DATED : November 5, 2013  
INVENTOR(S) : Gregory Christopher Burda et al.

It is certified that error appears in the above-identified patent and that said Letters Patent is hereby corrected as shown below:

Title Page, Item [54] and in the Specification, at Column 1, lines 1-4, Title should read:

WRITE-THROUGH-READ (WTR) COMPARATOR CIRCUITS, SYSTEMS, AND METHODS EMPLOYING WRITE-BACK STAGE AND USE OF SAME WITH A MULTIPLE-PORT FILE.

Signed and Sealed this  
Twenty-ninth Day of April, 2014

Michelle K. Lee  
*Deputy Director of the United States Patent and Trademark Office*